April 23, 1946.  E. A. MIDLING  2,399,133
CABLE CONNECTOR
Filed June 28, 1944
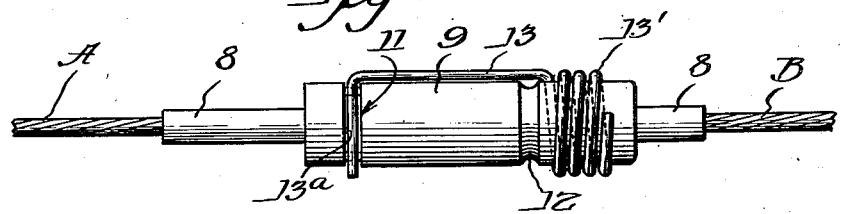
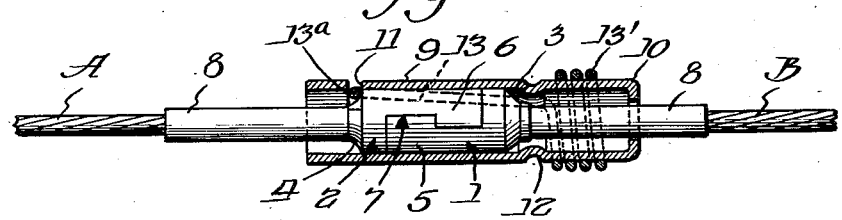
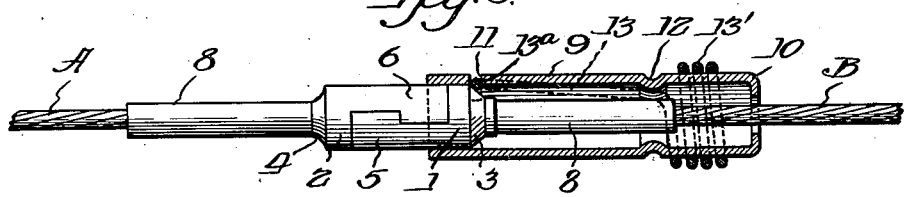
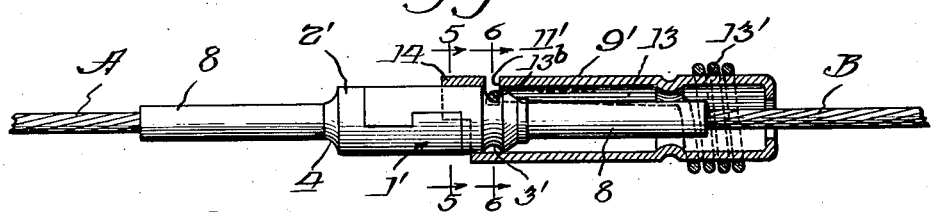
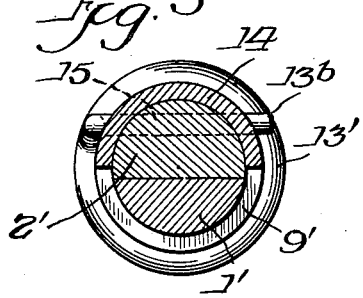
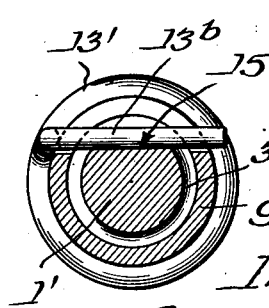
Inventor:
Eugene A. Midling
By W. F. Kellogg
Atty.

Patented Apr. 23, 1946

2,399,133

UNITED STATES PATENT OFFICE 2,399,133

CABLE CONNECTOR

Eugene A. Midling, Kalamazoo, Mich., assignor to Shakespeare Products Company, Kalamazoo, Mich., a corporation of Michigan Application June 28, 1944, Serial No. 542,523

12 Claims. (Cl. 287—104)

This invention relates to improvements in connecting devices, and has for an object to provide a connector for control pull-cables, i. e., cables employed for transmitting linear or similar control motion from one point to another, via regular or irregular paths of travel, the device being especially advantageous for use in difficult-to-reach or limited areas or spaces, as for example, in and between the walls of airplane fuselages, where more often, such cables cannot be pulled through or installed in one piece.

Additionally, it is an object of my invention to provide a connector of the indicated character, capable of advantageous and efficient use in the repairing of motion transmitting cables, and by the same token, their replacement.

In many instances, motion transmitting cables or wires must, necessarily, be installed and operated in and through space-limited and tortuous areas, difficult and impractical of access. Instances of such difficulties are, very frequently, found in the installation of control pull-cables in and through the walls of airplane fusilages. In many such instances the distance to be traversed by the cable or cables, and the tortuous character thereof, prohibits the pulling of one piece cables therethrough. Consequently, it becomes necessary that connected or united sections of cable be used. Because, however, of the practical inaccessibility to these spaces, serious impedence is oftentimes encountered when the cable sections are to be connected. Therefore, it is highly desirable to provide a cable connector so designed and constructed that its operative connection can be quickly, simply and, quite important, securely effected. Moreover, a great need for such a connector, under operating conditions, as above, manifests itself in repair and replacement work, where the same restricted working conditions, as aforesaid, are encountered. My improved connector is capable of attachment to the adjacent or meeting ends of pull-cable sections in a minimum of time and with a minimum of effort or labor. The connector, when attached or installed, will provide a maximum of connection security, whereby to insure a faithful transmission of linear or pull motion therethrough. By reason of its simple and compact construction, the device may be conveniently, easily and quickly attached to the ends of cables received in highly space-restricted and difficult areas for interconnecting them. Additionally, it should be understood that the connector, when it is so required, may be as conveniently, easily and quickly disconnected.

The foregoing, as well as other objects, advantages, and meritorious teachings of the invention, will be in part obvious and in part pointed out in the following detailed disclosure thereof, when taken in conjunction with the accompanying drawing, it being understood that the particular form of the invention presented herein is a precise and, what is now considered to be, the best mode of embodying its principles, but that modifications and changes may be made in specific embodiments, without departing from its essential features.

In the drawing:

Figure 1 is an enlarged side elevation of my improved connecting device.

Figure 2 is a longitudinal section through the same showing the sleeve in connected or engaged position.

Figure 3 is a similar view wherein the sleeve of the connector is shown partially disengaged from the coupling elements.

Figure 4 is an enlarged longitudinal section through a slightly modified form of the connecting device, wherein the sleeve construction and the formation of one end of one of the coupling devices has been modified.

Figure 5 is an enlarged transverse section taken on the line 5—5 of Figure 4, looking in the direction in which the arrows point, and Figure 6 is a similar view taken on the line 6—6 of Figure 4, looking in the direction in which the arrows point.

Having more particular reference to the drawing, in connection with which like characters of reference will designate corresponding parts throughout, the improved device, as illustrated in Figures 1 to 3, inclusive, comprises substantially complemental coupling elements 1 and 2 having correspondingly cross-sectionally circularly shaped and sized bases annularly shouldered, as at 3 and 4 (hereinafter more fully described) and longitudinally disposed cross-sectionally semicircularly shaped complemental, though opposed, fingers 5 and 6 extended therefrom, as shown in Figures 2 and 3 of the accompanying drawing. The coupling elements, as will be seen, are adapted to be operatively arranged in juxtaposed relationship. To effect interengagement or coupling of said elements, the meeting faces or portions thereof are of scarf formation, as indicated at 7. In consequence, the elements may be transversely interengaged and when so related, will be prevented from becoming longitudinally disengaged.

Co-axially disposed and relatively reduced cross-sectionally circular shanks 8 are fixedly carried by the normally opposite ends of the coupling elements 1 and 2 and are provided with longitudinal outwardly opening pockets or bores, whereby to permit the connection of adjacent ends of pull cables or wires A and B thereto.

At this point, attention is directed to the fact that the annularly shouldered end portions 3 and 4 of the several coupling element bases are arranged between such bases and the inner ends of their respective shanks 8. The shoulder 4 is of dished or notch-like cross-sectional formation, while the shoulder 3 is planely beveled. Accordingly, it will be readily understood that the coupling latch member, hereinafter described, will be securely retained in the shoulder 4 against longitudinal displacement therefrom following its introduction thereinto, whereas, it will be permitted to longitudinally slide over the shoulder 3 with a minimum of resistance.

To detachably or releasably secure the coupling elements 1 and 2 in interengaged relation, as aforesaid, and against lateral or transverse disconnection, a sleeve 9 is provided. The sleeve is of cross-sectionally circular shape and its diameter is such that it will have snug sliding engagement over the interengaged coupling elements 1 and 2, as will be seen upon reference to Figures 2 and 3 of the accompanying drawing. The length of this sleeve 9 is materially greater than the combined or overall length of the interengaged elements 1 and 2, and one end thereof is, preferably, constricted or flanged, as at 10. Thus, the particularly adjacent shank 8 will be allowed free engagement therethrough.

One end portion of the sleeve 9 has a transversely disposed slot 11 formed therein, suitably spaced from its adjacent end. A bead groove or inner periphery carried stop 12 is provided the sleeve, in spaced relation to its opposite end and the slot 11. The distance or spacing between the slot 11 and the internal stop 12, it should be noted, substantially corresponds to the combined length of the interengaged coupling elements 1 and 2, to the extent, that when the presently described latch member is engaged in the annular shoulder 4, to prevent undesired disengagement of the sleeve 9 from over or about said coupling element, the internal stop 12 will be adjacent or abuttingly engaged with the shouldered end 3 of the coupling element 1. Consequently, the sleeve 9 will have practically no endwise or longitudinal sliding movement when latched in engaged relationship to the interengaged coupling elements.

A latch carrying arm 13 having a coiled spring basal portion 13' and a substantially right angularly disposed latch member or finger 13ª, is provided on the sleeve 9. The coiled portion 13', as shown in Figures 2 and 3, has frictional gripping engagement with and about the outer periphery of one end portion of said sleeve, particularly, between the internal stop 12 and its near end; hence, affording secure anchorage. The latch member 13ª on the remaining end of the carrying arm 13, is disposed directly adjacent and normally parallel to the sleeve slot 11, in order that it may move freely into and out of the same.

To use my improved connector for connecting the adjacent ends of sections of cables or wires A and B, it, of course, will be understood that the ends of said cable or wire sections are fixedly joined to the shanks 8 of the several coupling elements 1 and 2, respectively. The scarf joint formed portions of the coupling elements are now transversely interengaged. Thereupon, the sleeve 9 is slid over and about the interengaged coupling elements 1 and 2, as shown in Figure 2 of the accompanying drawing. As said sleeve is slid to its connecting or operative position with respect to the coupling elements of the device, it will be observed that the normally inwardly spring pressed latch member 13ª, engaged in its transverse slot 11, will be engaged with and permitted to ride freely over the annular beveled shoulder 3 of the coupling element 1, and then, over and along the adjacent surfaces of the coupling elements. As and when the sleeve 9 is fully slid or engaged over said coupling elements, the spring pressed latch member 13ª will automatically engage in the dished or notch-like shoulder 4 of the coupling element 2, wherein it will lock securely, and so, prevent reverse or disengaging sliding movement of said sleeve. Accordingly, a positive and secure connection or union will be effected between the cable or wire sections A and B. Moreover, it is to be particularly noted that the stop 12, within the sleeve 9, will be concurrently brought into proximity to or abutting engagement with the adjacent beveled shoulder end portion 3 of the coupling element 1, so that the sleeve will have or be permitted practically no endwise longitudinal movement, when latched or locked in the manner indicated.

To disengage or disconnect the cable or wire sections A and B, it is obvious that the spring pressed latch member 13ª need only be moved outwardly with respect to the transverse slot 11 to become removed from the dished or notch-like shoulder 4 of the coupling element 2, whereupon the sleeve can be freely slid in a reverse direction to remove it from the engaged coupling elements 1 and 2 in order to permit their transverse disengagement or disconnection.

In the Figures 4, 5 and 6, I have shown a slightly modified form of my improved connecting device. In this modified form, the sleeve 9' is provided, upon its normally inner end, with an arcuately shaped co-axially disposed extension 14, preferably integral therewith and, of course, beyond the transverse slot 11'. The basal portion of the coupling element 1' is formed with a dished or notch-like shoulder 3', somewhat similar in formation to the shoulder 4 of the previously described coupling element 2, though deeper. One side of this shouldered portion 3' is flattened, as at 15 and, at times, the latch member 13ᵇ is adapted to engage or substantially flushly seat thereon, in the manner shown in Figure 6.

In usage of the modified form of my connecting device, it will be observed that when the sleeve 9' is slid to the position shown in Figure 4, the extension 14 will be engaged over and along a portion of the longitudinal extension of the coupling 1', while the substantially diametrically opposite side of said sleeve will be positioned outwardly of or beyond the near end of the longitudinal extension of the coupling element 2'. With the sleeve 9' so positioned, it is manifest that transverse disconnection or separation of the several coupling elements 1' and 2' can be freely effected. Additionally, it will be noted that the sleeve 9' will be securely, though releasably, retained in engagement with the coupling element 1', thus preventing the same from sliding along the cable B, possibly, out of reach, or at least, to an inconvenient and troublesome position when the user desires to slide it to a locking position upon or over the subsequently transversely engaged coupling elements 1' and 2'.

If wanted, the sleeve 9' may be quickly moved or slid from engagement with the coupling element 1' by slightly turning or rotating it, whereupon the latch member 13ᵇ becomes removed or disengaged from the flattened portion 15, and so, is shifted to anywhere else on or about the annular shoulder 3', hence, permitting said latch member 13ᵇ to move, more or less freely, from the annular shoulder as the sleeve 9' is forced in an outer or disengaging direction toward or onto the cable B.

The modified form of sleeve 9', obviously, permits of easy and one-handed manipulation of the connecting device, and additionally, because of the temporary engagement of the latch member 13ᵇ in the annular shoulder 3', as above explained, displacement or loss of the sleeve 9', by unwanted or excessive movement from or beyond the coupling element 1' and over the adjacent cable or wire section, will be prevented.

A connecting device constructed in accordance with my invention, is primarily intended for use in the quick, though secure, connecting and disconnecting of cable or wire sections employed in transmitting pull, i. e., for cables or wires wherein the actuation or operation is effected by pull, although it is usual that the cable is under tension suitably provided by a spring return or some such similar means in connection with the operated apparatus or device, whereby the same will be caused to return to its normal position.

For illustration purposes, it may be noted that some—not all—of the uses for such pull type cables or wires, are the release of bomb loads or auxiliary fuel tanks from airplanes. These are simple pull operations, and the cable, that is, the control in which it is incorporated, is not used again until new loads or other equipment are installed for other trips. It is, however, manifest that the connecting device can be effectually used in substantially any or all pull cables or wires, or sections thereof.

The connecting device is especially intended, and is advantageous for use in providing a break or a plurality of breaks in long pull cables or wires, viz, pull cables or wires installed in the walls of airplane fuselages, wherein the same must be in comparatively short lengths for installation after all other assembly is completed; additionally, for the purpose of facilitating the making of easy and quick repairs and replacements.

By reason of the novel formation and operative association of the constructional parts of my improved connector, it is to be appreciated that convenience, quickness and simplicity of operation thereof, during both connection and disconnection of the same, are provided; also, that because of its compactness and simplicity, the same may be most satisfactorily manipulated, even in highly restricted spaces, with but one hand. And due to the length of the sleeve 9, which, as hereinbefore stated, is greater than the overall or combined length of the coupling elements 1, 1', 2 and 2', when interengaged, it will be seen that the same is made self-guiding with respect to its movement upon the interengaged coupling elements; hence, much more easily used or manipulated with one hand.

I claim:

1. A connecting device, comprising interengaged relatively non-longitudinally disengageable coupling means, a sleeve snugly and slidably engaged over said coupling means retaining them interengaged, the length of the sleeve being greater than the combined length of the coupling means, latch means carried by the sleeve engageable with a portion of one of the coupling means, and stop means on said sleeve spaced from the latch means for a distance substantially corresponding to the combined length of the interengaged coupling means abuttingly engageable with the adjacent end of the other of said coupling means, at times.

2. A connecting device, comprising interengaged relatively non-longitudinally disengageable coupling means, a sleeve snugly and slidably engaged over said coupling means retaining them interengaged, the length of the sleeve being greater than the overall length of the interengaged coupling means, latch means carried by the sleeve inwardly engageable with one of the coupling means, and internally circumferentially disposed stop means on said sleeve spaced from the latch means for a distance substantially corresponding to the overall length of the interengaged coupling means abuttingly engageable with an adjacent end of the remaining coupling means.

3. A connecting device, comprising interengaged relatively non-longitudinally disengageable coupling means, co-axially disposed and relatively reduced shanks on the normally opposite ends of said coupling means, each of said coupling means being annularly shouldered adjacent their opposite ends, a sleeve snugly and slidably engaged over said coupling means retaining them interengaged, one end of said sleeve being constricted and snugly and slidably receiving the shank of one of said coupling means therethrough, the length of said sleeve being greater than the combined length of the coupling means, latch means carried by the sleeve engageable with the shouldered end of one of said coupling means, and internally arranged beading carried by the sleeve intermediately of its opposite ends abuttingly engageable with the shouldered end of the remaining coupling means and spaced from the latch means for a distance substantially corresponding to the combined length of the interengaged coupling means.

4. A connecting device, comprising interengaged relatively non-longitudinally disengageable coupling means, certain of the ends of each of said coupling means being annularly shouldered and a portion of the annular shoulder of one of said coupling means being flattened, a sleeve snugly and slidably engaged over said coupling means retaining them interengaged, the length of the sleeve being greater than the combined length of the coupling means, an outer end portion of the sleeve having a transverse slot therein, spring latch means carried by the sleeve engageable through said transverse slot and with the annularly shouldered ends of the coupling means, at certain times, and internal stop means on said sleeve intermediately of its opposite ends abuttingly engageable with the adjacent end of one of said coupling means, at times.

5. A connecting device, comprising interengaged relatively non-longitudinally disengageable coupling means, certain of the ends of said coupling means being each annularly shouldered and one of said shouldered ends having a flattened portion, a sleeve snugly and slidably engaged over said coupling means retaining them interengaged, the length of the sleeve being greater than the combined length of the coupling means, an arcuately shaped co-axially disposed extension on one of the ends of said sleeve and an adjacent portion of the sleeve having a transversely disposed slot formed therein, a spring latch carried by the sleeve engageable in said slot and, optionally, engageable with the annularly shouldered ends of said coupling means, and internally aranged stop means on said sleeve intermediately of its opposite ends abuttingly engageable, at times with the shoulder of one of said coupling means, said stop means being spaced from said transverse slot in the sleeve for a distance substantially corresponding to the combined length of the interengaged coupling means.

6. A connecting device, comprising detachably interengaged coupling means, a sleeve slidably engaged over said coupling means retaining them interengaged, an end portion of said sleeve having a transverse slot therein, a spring latch means carried by the sleeve having its free end portion normally and inwardly springingly engaged in said slot and removably engaged with a portion of one of the coupling means.

7. A connecting device, comprising detachably interengaged coupling means, a sleeve slidably engaged over said coupling means retaining them interengaged, an outer end portion of the sleeve having a transverse slot therein, a coiled spring body engaged about and with a portion of the sleeve, and an arm extending angularly from one end of the coiled body substantially longitudinally of said sleeve having its free end portion appropriately formed and normally springingly engaged into said slot and removably engaged with a portion of one of the coupling means.

8. A connecting device, comprising detachably interengaged coupling means, a sleeve slidably engaged over said coupling means retaining them interengaged, an end portion of said sleeve having a transverse slot therein, a body grippingly engaged about and with a portion of the sleeve, and a spring arm carried by and extending from said body substantially longitudinally of said sleeve having its free end portion appropriately formed and normally springingly engaged into said slot and removably engaged with a portion of one of the coupling means.

9. A connecting device, comprising detachably interengaged coupling means, a sleeve slidably engaged over said coupling means retaining them interengaged, a coiled spring body engaged about and with a portion of the sleeve, and an arm extending angularly from one end of the coiled body generally longitudinally of said sleeve having its free end portion normally springingly engaged through said sleeve and with a portion of one of the coupling means.

10. A connecting device, comprising detachably interengaged coupling means, the opposite ends of the coupling means being shouldered, a sleeve slidably engaged over said coupling means retaining them interengaged, an outer end portion of the sleeve having a transverse slot therein, a body grippingly engaged about and with a portion of the sleeve, and a spring arm carried by and extending from said body generally longitudinally of the sleeve having its free end portion appropriately formed and normally engaged into said slot and with the shouldered end of one of said coupling means.

11. A connecting device, comprising detachably interengaged coupling means, each of said coupling means being annularly shouldered adjacent their opposite ends, a sleeve slidably engaged over said coupling means retaining them interengaged, an outer end portion of the sleeve having a transverse slot therein, one end of said sleeve being constricted and slidably receiving a portion of the adjacent coupling means therethrough, a body grippingly engaged about and with a portion of said sleeve adjacent its constricted end, a spring arm carried by and extending from said body generally longitudinally of said sleeve having its free end portion appropriately formed and normally engaged into said slot and removably engaged with the shouldered end of one of said coupling means.

12. A connecting device, comprising detachably interengaged coupling means, co-axially disposed and relatively reduced shanks on the normally opposite ends of said coupling means, each of said coupling means being annularly shouldered adjacent their opposite ends, a sleeve slidably engaged over said coupling means retaining them interengaged, the length of said sleeve being greater than the combined length of the coupling means, an outer end portion of said sleeve having a transverse slot therein and its opposite end being constricted and slidably receiving the shank of one of said coupling means therethrough, an internal stop carried by the sleeve in spaced relation to its constricted end engageable, at times, with the shouldered end of the adjacent coupling means, a coiled spring body engaged about and with a portion of the sleeve in proximity to its constricted end, and an arm extending angularly from one end of the coiled spring body substantially longitudinally of said sleeve having its free end portion appropriately formed and normally springingly engaged into said slot and removably engaged with the shouldered end of the remaining coupling means.

EUGENE A. MIDLING.